Feb. 4, 1969  G. D. SMITH  3,425,883
METHOD OF MAKING A MOLDED V-BELT
Filed Feb. 23, 1965
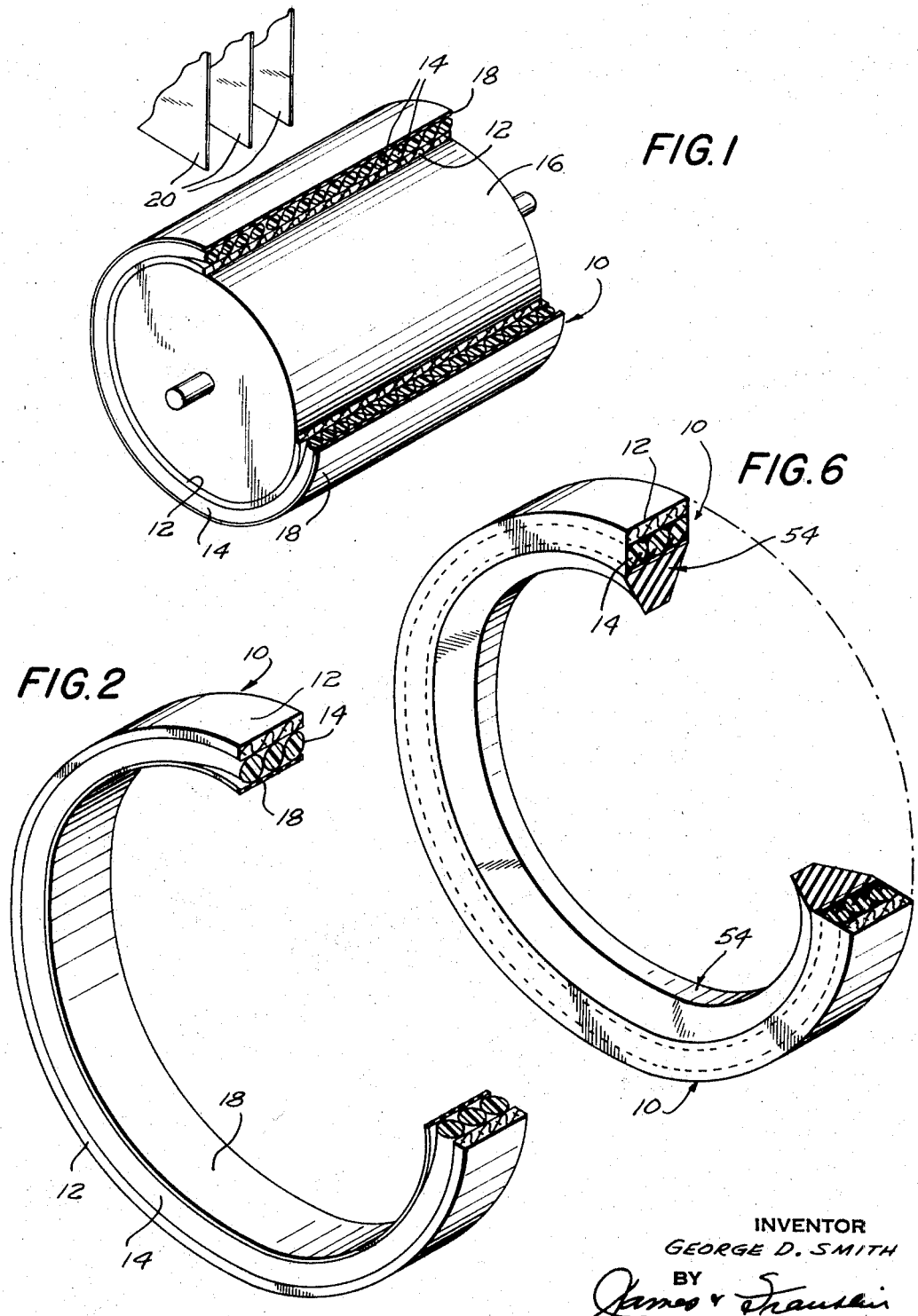
INVENTOR
GEORGE D. SMITH
BY
James & Franklin
ATTORNEY Feb. 4, 1969
G. D. SMITH
3,425,883
METHOD OF MAKING A MOLDED V-BELT
Filed Feb. 23, 1965
Sheet 2 of 2
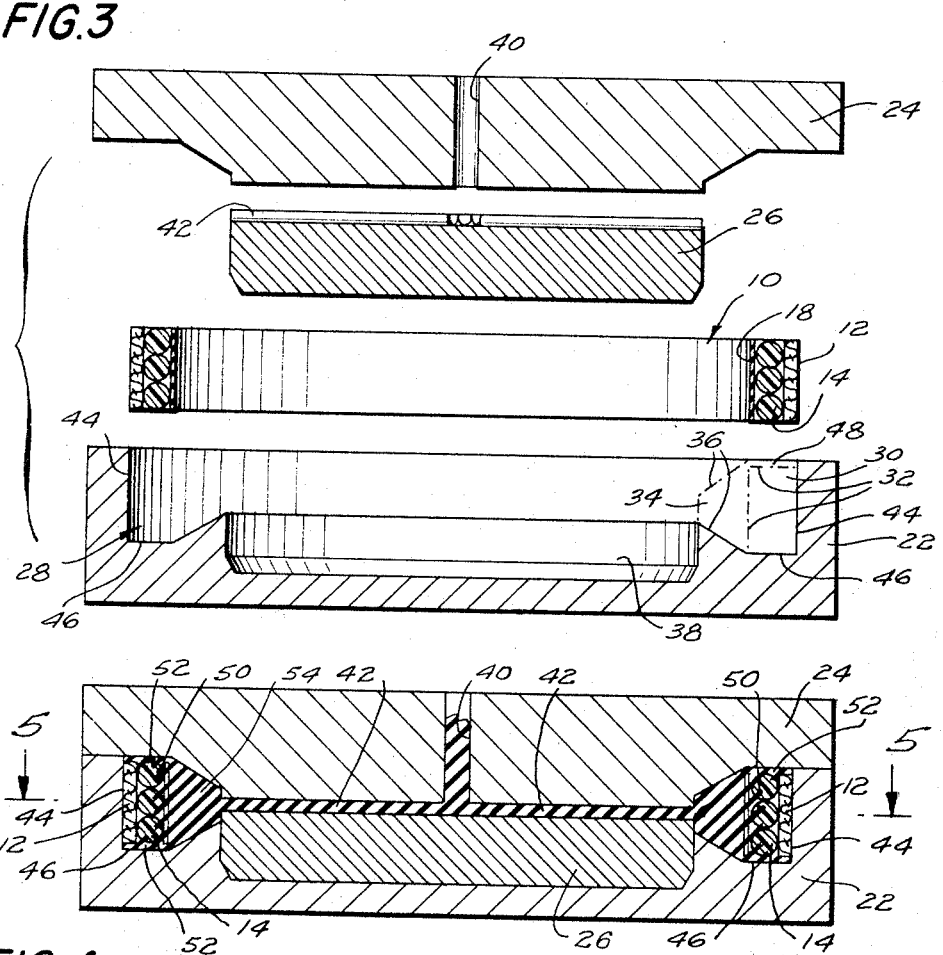
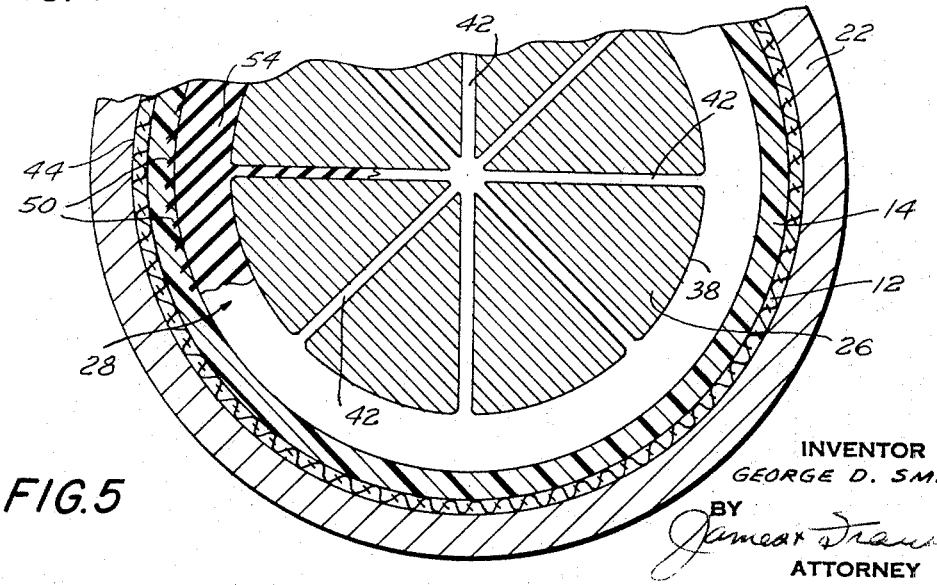
INVENTOR
GEORGE D. SMITH
BY
ATTORNEY

United States Patent Office 3,425,883
Patented Feb. 4, 1969

3,425,883
METHOD OF MAKING A MOLDED V-BELT
George D. Smith, Oakland, N.J., assignor to Raybestos-Manhattan, Inc., Passaic, N.J., a corporation of New Jersey
Filed Feb. 23, 1965, Ser. No. 434,286
U.S. Cl. 156—140
Int. Cl. B29h 7/22
5 Claims

ABSTRACT OF THE DISCLOSURE

A method of making a molded V-belt by mold injecting under elevated pressure and temperature rubber stock into a mold cavity, said method comprising building a sleeve composed of a rubberized fabric back and a superimposed cord layer, said sleeve forming the tension section of the molded belt being produced, placing said sleeve into a part of a circular cavity of an injection mold with the fabric back of the sleeve in engagement with the outer circular wall of the cavity and the said cord layer facing inwardly of the mold cavity, the remaining part of the mold cavity being generally V-shaped in cross-section, and injecting rubber stock in a direction toward said sleeve thereby filling the said remaining part of the mold cavity, the injected rubber stock forming the compression section of the molded belt being produced, and curing the belt.

---

This invention relates to a novel method of making V-belts.

In known methods of making transmission as well as conveyor V-belts, a belt body is built up on a collapsible mandrel by applying one or more layers of sheeted rubberized fabric over the surface of the mandrel, helically winding circumferentially thereon a continuous inextensible cord forming one or more layers of parallelly arranged cords, thereby forming a sleeve which is to define the tension section of the belt, over which is then wound a layer of rubber stock which is to form the compression section of the belt. This belt body, or individual cut sections thereof, is then subjected to heat and pressure in a mold to vulcanize or cure the belt.

Molds commonly used for the molding step are of two types, namely ring molds and open end molds. Built-up belts processed in such molds are subject to undesired deformations. In the ring type mold, the belt is manually loaded by being placed over a mold pin and pushed down into the mold by hand. In so doing, the cords are subjected to the possibility of being "rolled," thus upsetting the cord line, producing a distortion leading to belt "rejects." In an open end mold, the belts are placed over stretcher bars which are extended to predetermined length; and the cord which passes over the bars is subject to pulling pressures with the possibility of being flattened. When this area is in the mold cavity to be cured, it moves in undetermined fashion disturbing the cord line.

In the building up of the belt body on the mandrel, other problems are met with which affect the ultimate product, namely the vulcanized belt. Since the belt body is premade, with all of the so-called base gum (the compression rubber stock) applied, it is required that the applied stock be conformed to a desired mass and weight to fit the mold cavity. However, if for any reason such as specific gravity changes, cut widths shrinkages, size settings or any other requirements fail to conform to the necessary standards, the belt bodies will not have the desired volume to accurately fill the designed cavity. Also, because base gums cover splices, a uniform top width for the belt is difficult to achieve when the belt is loaded in a ring type mold; and because this non-uniform top width running in sheaves constantly moves up and down, belt vibration results particularly at accelerated speeds. Since the cures of a belt made in an open end mold overlap each other, hard spots develop in areas receiving more than one cure; and these hard spots flexing differently when passing through the sheath also produce what is known as vibration.

Constradistinguished from these prior methods, the method of making a molded V-belt in accordance with my present invention comprises building about a suitable mandrel a sleeve composed of a rubberized fabric back and a superimposed cord layer or layers, placing the same in a part of a circular cavity of an injection mold, said part conforming in dimensions to those of the sleeve, with the fabric back of the sleeve in engagement with a terminal wall of the cavity and the said cord layer facing inwardly of the mold cavity, the remaining part of the mold cavity being generally V-shaped in cross-section, and mold injecting under elevated pressure and temperature rubber stock into the mold cavity in a direction toward said sleeve, thereby filling the mold cavity and curing the belt, said sleeve forming the tension section of the belt and the said injected rubber forming the compression section of the belt.

With this method, the following prime objects and advantages over the prior methods are achieved:

(1) A precision fully molded V-belt is produced;

(2) An accurately positioned and undisturbed cord line, not subject to any distortion producing forces in the mold is obtained;

(3) The accurate positioning of the fabric-cord sleeve in the mold, the filling of the mold cavity with the injected rubber stock, and the close mold tolerances, yield belts of uniform and consistent sizes;

(4) The base stock, injected at elevated pressures and temperatures, causes the rubber to be driven into penetration and entanglement with the fibers and cords of the tension section (strength member) of the belt, thereby producing a product with exceptional adhesion between the compression section and the tension section. This also results in sealing the edges of the cords, thereby minimizing the chances of cords pulling out at the sides of the formed belts;

(5) Because the belts are precision molded and the mold cavities are uniformly filled and the curing is done in a single shot, the resulting belt has uniform mass throughout, uniformly cured, resulting in a more vibrationless belt than is attained by prior methods allowing for high per minute speeds in belt movement;

(6) Because high temperatures and high injection pressures are utilized, curing time requirements are drastically lowered; and (7) An overall simplified method of making jacketless or coverless belts is obtained.

To the accomplishments of the foregoing objects and other objects that will appear as the description proceeds, the present invention relates to the novel method of making V-belts as sought to be defined in the appended claims, taken with the following description thereof and the accompanying drawings, in which:

FIG. 1 is a view illustrating the first step of the method showing the building up of a belt sleeve on a mandrel, the belt sleeve being shown with a part cut away and other parts shown in section, the said belt sleeve being made of a width from which individual belt sleeves are slitted or cut;

FIG. 2 is a perspective view shown to an enlarged scale of an individual belt sleeve, with a part being cut away and other parts shown in section;

FIGS. 3 to 5 are views illustrating the second or molding step of the method of which;

FIG. 3 is a view showing in exploded form, with the parts shown in section, the sections of the mold and the belt sleeve of FIG. 2 about to be placed into the mold;

FIG. 4 is a view showing the mold sections in closed condition, with the illustrated parts shown in section, and depicting the rubber injection step of the method;

FIG. 5 is a view, with a part broken away, taken in cross-section in the plane of the line 5—5 of FIG. 4; and FIG. 6 is a perspective view of the completed V-belt, with a part broken away and other parts shown in section, as produced by the steps of the method.

Referring now more in detail to the drawings and having reference first to FIG. 1 thereof, the belt sleeve 10 comprising a rubberized fabric back 12 and a superimposed cord section 14 is built according to known methods on a collapsible mandrel 16. More specifically the belt sleeve 10 is made by wrapping one or more layers of sheeted rubberized fabric over the surface of the mandrel producing the fabric back 12 and by then helically winding circumferentially thereon a continuous inextensible cord forming one or more layers of parallelly arranged cords, thereby producing the cord section 14, the sleeve 10 thus produced defining the ultimate tension section of the belt. Spread over the cord section 14, I then apply a thin (such as .015" thick) layer of tie-gum (rubber) 18 which functions to hold the cords of the cord section 14 in place to permit further handling of the sheet (and the individual cut sections thereof) as well as for being united to the later injected compression section of the belt. The belt sleeve 10 is made of a width from which individual belt sections are cut or slitted as by means of the slitting blades 20; said belt sleeve 10 may, for example, be of a width such as 50", from which may be cut individual belts having widths ranging from 3/8" to 7/8".

FIG. 2 shows the structure of an individual belt sleeve cut from the belt sleeve 10 of FIG. 1 and then inverted for the molding step of the process. Designating the parts in FIG. 2 with the reference characters of FIG. 1, the individual belt sleeve 10 thus inverted comprises a rubberized fabric back 12, now shown as the outside wall of the belt sleeve, the cord section 14 and the tie rubber layer or coating 18, the latter now shown as the inside wall of the belt sleeve.

Refering now to FIGS. 3 to 5 of the drawings on the molding step of the method, I provide a mold comprising a bottom female section 22, a top male section 24 and a third inserted section 26 depicted in exploded form in FIG. 3 and in assembled molding form in FIGS. 4 and 5. The sections of the mold are fashioned to form a circular cavity generally designated as 28 subdivided in a part 30 delineated in phantom by the dotted lines 32 in FIG. 3 of the drawings, said part 30 being therefore rectangular in cross-section to conform to the rectangular cross-sectional dimensions of the belt sleeve 10 and a part 34 which is generally V-shaped in cross-section as delineated partly in phantom by the dotted and full lines 36 in FIG. 3, thereby conforming to the V-shaped cross-sectional dimensions of the base rubber, namely the rubber stock which is to be injected into the mold. The bottom mold section 22 is provided with a central recess or cavity 38 to receive the inserted section 26 of the mold. The top mold section is provided centrally with an injection sprue 40 which in the mold assembly (FIG. 4) communicates with a plurality of radially directed gates 42, 42 formed as shown in FIG. 5 in the top wall of the inserted mold section 26, the gates 42 communicating with the circular mold cavity 28. The gates 42 as shown in FIG. 5 are spaced preferably uniformly circumferentially around the mold.

Preparatory to the molding step, the belt section 10 is inserted into the female mold section 22 and into the space part 30 thereof, with the fabric back 12 of the sleeve adjacent to or in direct engagement with a terminal wall 44 of the mold cavity and thus with the cord layer or section 14 facing inwardly of the mold cavity, as clearly shown in FIG. 4 of the drawings. In so positioning the belt sleeve in the space part 30 of the mold, the bottom of the belt sleeve fits onto flat lands 46 which define the bottoms of the space parts 30. The cord section 14 having been wound to a size determined by the mold, thus placing the belt sleeve 10 into the space part 30 of the mold cavity, results in a close or an accurate fitting of the belt sleeve into this part or section of the mold and thereby the belt sleeve 10 is not subject to any distortion, or to any other human error with the result that there is no displacement of the cord line in this step of the process. Preferably the height of the belt sleeve is such as to leave a small space 48, as shown at the right of FIG. 3 of the drawings, in this part of the mold cavity.

When the mold sections are assembled and closed, rubber stock is injected under elevated pressure and temperature into the sprue 40 of the mold and flowing through the gates 42 is injected into and fills the circular cavity of the mold. The rubber stock is introduced into the mold at a pressure of the order of 2500 lbs. per square inch and the pressure builds up a heat of the order of 400° to 450° F. The mold itself is maintained at a high temperature of the order of 350 to 450° F. At these elevated temperatures and pressures the rubber stock in flowing into the mold cavity is forced in between and around the cords of the cord section 14 and into the fabric section 12, after uniting with the tie-gum rubber coating 18, causing the rubber stock to penetrate and become entangled with the fibers and the cords of the tension sleeve section of the belt as depicted at 50 in FIGS. 4 and 5 of the drawings. A product is thereby produced with exceptional adhesion between the injected rubber stock which defines the compression section of the belt and the sleeve which later defines the tension section of the belt. This action also results in a sealing of the edges of the cords as depicted at 52 in FIG. 4 of the drawings, thereby minimizing the chances of cords pulling out at the sides of the formed belts. The rubber stock being injected at approximately eight equidistant points around the mold circumference exerts pressure in all directions equally, thereby avoiding any disturbance to the cord line which, as aforesaid, has already been placed in the proper area without cord disalignment.

This injection mold is designed to produce V-belts in circumferential dimensions in the range between 30" to 50". The belt is molded in a single shot; and at the temperatures and pressures employed the mold cycle is a comparatively short one, the belt being molded in the time cycle of from 45 seconds to a minute.

The injected rubber stock may be any desirable rubber composition, it being preferred when making fully molded jacketless or coverless V-belts to use as fiber loaded neoprene compound, i.e. a chloroprene rubber having lint fibers randomly dispersed throughout.

The resulting belt product when taken from the mold is shown in FIG. 6 of the drawings. This comprises the sleeve section 10 which defines the tension section of the belt and the injected mold section generally designated as 54 which defines the V compression section of the mold. Since in the preferred practice of the method the belt sleeve 10 was inverted prior to being placed into the mold, the completed V-belt when removed from the mold requires no further inversion.

The method of making V-belts of the present invention and the many advantages thereof will, it is believed, be clear from the above detailed description thereof. Thereby a precision fully molded V-belt is produced in which an accurately positioned and undisturbed cord line is initially obtained in the placement of the belt sleeve in the mold and such cord line is not subject to any distortion producing forces in the injection step of the mold. The result is also with the close mold tolerances that belts of uniform and consistent sizes are obtained. The resulting belts are devoid of flash which normally have to be trimmed from belt corners. The cord edges of the tension section of the belt are sealed, thereby minimizing the chances of cords pulling out at the sides of the formed belt. Since the belts are precision molded and the mold cavities are uniformly filled and the curing is done in a single shot, the resulting belt has uniform mass throughout, is uniformly cured, resulting in a more vibrationless belt than is obtained by prior methods. In the case where the belt section or sleeve 10 is placed into the mold with the fabric back 12 in direct engagement with the mold terminal wall 44, the belt sleeve is not subject to stretching in the injection step of the method; and in the case where the belt sleeve, of slightly smaller circumferential dimensions is placed into the mold with the fabric back 12 adjacent to and slightly spaced from the wall 44, the belt sleeve is stretched during the injection step of the method, with the result that the sleeve section of the belt is tensioned while the belt is being cured. Because high temperatures and high injection pressures are utilized, curing time requirements are drastically lowered. An overall simplified method of making jacketless belts is obtained.

It will be apparent that changes may be made in the described procedural steps, in the use of materials, etc., without departing from the spirit of the invention defined in the following claims.

I claim:

1. The method of making a molded V-belt by mold injecting under elevated pressure and temperature rubber stock into a mold cavity, said method comprising building a sleeve composed of a rubberized fabric back and a superimposed cord layer, placing the sleeve into a part of a circular cavity of an injection mold, said part conforming in dimensions to those of the sleeve, with the fabric back of the sleeve in engagement with the outer circular wall of the cavity and the said cord layer facing inwardly of the mold cavity, the remaining part of the mold cavity being generally V-shaped in cross-section, and injecting said rubber stock into the mold cavity at a plurality of points around the mold circumference, the injection of the rubber stock at such points being in a direction radially toward said sleeve, thereby causing the injected rubber stock to (a) exert pressure substantially equally against said sleeve at such injection points thereby avoiding disturbance to the cord line of said cord layer and (b) penetrate the cord layer and the fabric back of the sleeve, filling the mold cavity and curing the belt, said sleeve forming the tension section of the belt and the said injected rubber stock forming the compression section of the belt.

2. The method of claim 1, in which the built up sleeve is rectangular in cross-section, and the first mentioned part of the mold cavity conforms in dimensions to the rectangular cross-section of the sleeve.

3. The method of claim 1, in which in the building of the sleeve there is applied a thin layer of tie-rubber over the cord layer.

4. The method as claimed in claim 1, wherein the mold is maintained at a temperature of the order of 350° to 450° F. during the injecting of the rubber stock into the mold.

5. The method as claimed in claim 4, wherein the rubber stock is introduced into the mold at an elevated pressure building up to a temperature of the order of 400° to 450° F.

References Cited

UNITED STATES PATENTS

| 2,422,266 | 6/1947 | Steinke | 18—36 XR |
| 2,878,517 | 3/1959 | Cramer | 249—107 |
| 2,573,642 | 10/1951 | Hurry | 156—39 XR |
| 3,250,653 | 5/1966 | Geist et al. | 156—138 |
| 2,773,540 | 12/1956 | Waugh | 156—138 |

OTHER REFERENCES 596,289   1/1948   Great Britain.

PHILIP DIER, *Primary Examiner.*

U.S. Cl. X.R.

156—245; 264—269; 18—42; 249—57